US012746848B2

(12) United States Patent
Morimoto et al.

(10) Patent No.: US 12,746,848 B2
(45) Date of Patent: Sep. 29, 2026

(54) POWER SUPPLY DEVICE

(71) Applicant: Yazaki Corporation, Tokyo (JP)

(72) Inventors: Mitsuaki Morimoto, Susono (JP); Kazuo Sugimura, Susono (JP); Hiroteru Kato, Susono (JP); Shoya Watanabe, Susono (JP)

(73) Assignee: Yazaki Corporation, Tokyo (JP)

(*) Notice: Subject to any disclaimer, the term of this patent is extended or adjusted under 35 U.S.C. 154(b) by 720 days.

(21) Appl. No.: 18/329,176

(22) Filed: Jun. 5, 2023

(65) Prior Publication Data

US 2023/0391228 A1 Dec. 7, 2023

(30) Foreign Application Priority Data

Jun. 6, 2022 (JP) ................................ 2022-091419

(51) Int. Cl.
*H02M 7/5381* (2007.01)
*B60L 58/19* (2019.01)
*B60L 58/21* (2019.01)

(52) U.S. Cl.
CPC ............... *B60L 58/19* (2019.02); *B60L 58/21* (2019.02); *H02M 7/5381* (2013.01); *B60L 2210/30* (2013.01)

(58) Field of Classification Search
CPC ........ H02M 7/5381; B60L 58/19; B60L 58/21
See application file for complete search history.

(56) References Cited

U.S. PATENT DOCUMENTS

2022/0231537 A1* 7/2022 Hirota ..................... H02J 1/082

FOREIGN PATENT DOCUMENTS

| | | | |
|---|---|---|---|
| JP | 2010-57242 | A | 3/2010 |
| JP | 2019-80474 | A | 5/2019 |
| JP | 2020-150784 | A | 9/2020 |

* cited by examiner

*Primary Examiner* — Robert Grant
(74) *Attorney, Agent, or Firm* — Sughrue Mion, PLLC

(57) ABSTRACT

Positive electrode-side input terminal is connected to first positive electrode-side battery terminal, negative electrode-side input terminal is connected to second negative electrode-side battery terminal, a switch is connected between first negative electrode-side battery terminal and second positive electrode-side battery terminal, between second positive electrode-side battery terminal and first connection point between positive electrode-side input terminal and first positive electrode-side battery terminal, and between first negative electrode-side battery terminal and second connection point between negative electrode-side input terminal and second negative electrode-side battery terminal, positive electrode-side output terminal is connected to positive electrode-side converter output terminal, negative electrode-side output terminal is connected to negative electrode-side converter output terminal, positive electrode-side converter input terminal is connected to a line connecting positive electrode-side input terminal and first positive electrode-side battery terminal, and negative electrode-side converter input terminal is connected to a line connecting negative electrode-side input terminal and second negative electrode-side battery terminal.

12 Claims, 10 Drawing Sheets

POWER SUPPLY DEVICE

TECHNICAL FIELD

The present invention relates to a power supply device.

BACKGROUND

Electric vehicles (EV) and plug-in hybrid vehicles have become popular, and charging facilities capable of charging batteries of the electric vehicles have also become popular. There are various kinds of standards for the charging facilities that are currently installed, thus a power supply device of an electric vehicle needs to adapt to several standards of charging devices. For example, Patent Document 1 discloses a power supply device configured to switch connection of two batteries between parallel connection and series connection to adapt to a fast charger and to an ultra-fast charger in which voltage of supplied power is higher than that of the fast charger.

RELATED ART DOCUMENT

Patent Document

Patent Document 1: JP 2020-150784 A

SUMMARY OF THE INVENTION

Problem to be Solved by the Invention

However, in the power supply device disclosed in Patent Document 1, when the connection of the two batteries is switched, voltage applied to a load varies significantly. Thus, in the power supply device disclosed in Patent Document 1, the load cannot be operated during this switching of the connection of the two batteries.

In view of the problem described above, an object of the present invention is to provide a power supply device that is configured to adapt to a plurality of chargers without requiring interruption of operation of a load.

Solution to Problem

To solve the above-described problem and achieve the object described above, a power supply device according to one embodiment of the present invention includes a first positive electrode-side battery terminal and a first negative electrode-side battery terminal for connecting a battery, a second positive electrode-side battery terminal and a second negative electrode-side battery terminal for connecting a battery, a positive electrode-side input terminal and a negative electrode-side input terminal for connecting a charger, a positive electrode-side output terminal and a negative electrode-side output terminal for connecting a load, a first switch, a second switch, a third switch, and a power converter, wherein the positive electrode-side input terminal is connected to the first positive electrode-side battery terminal, the negative electrode-side input terminal is connected to the second negative electrode-side battery terminal, the first switch is connected between the first negative electrode-side battery terminal and the second positive electrode-side battery terminal, the second switch is connected between a first connection point and the second positive electrode-side battery terminal, the first connection point being between the positive electrode-side input terminal and the first positive electrode-side battery terminal, the third switch is connected between the first negative electrode-side battery terminal and a second connection point, the second connection point being between the negative electrode-side input terminal and the second negative electrode-side battery terminal, the power converter includes a positive electrode-side converter input terminal, a negative electrode-side converter input terminal, a positive electrode-side converter output terminal, and a negative electrode-side converter output terminal, the positive electrode-side output terminal is connected to the positive electrode-side converter output terminal, the negative electrode-side output terminal is connected to the negative electrode-side converter output terminal, the positive electrode-side converter input terminal is connected to a line that connects the positive electrode-side input terminal and the first positive electrode-side battery terminal, and the negative electrode-side converter input terminal is connected to a line that connects the negative electrode-side input terminal and the second negative electrode-side battery terminal.

Advantageous Effect of the Invention

According to the present invention, it is possible to provide a power supply device that is configured to adapt to a plurality of chargers without requiring interruption of operation of a load.

DETAILED DESCRIPTION OF PREFERRED EMBODIMENTS

<Power Supply Device 100>

Figure 1:
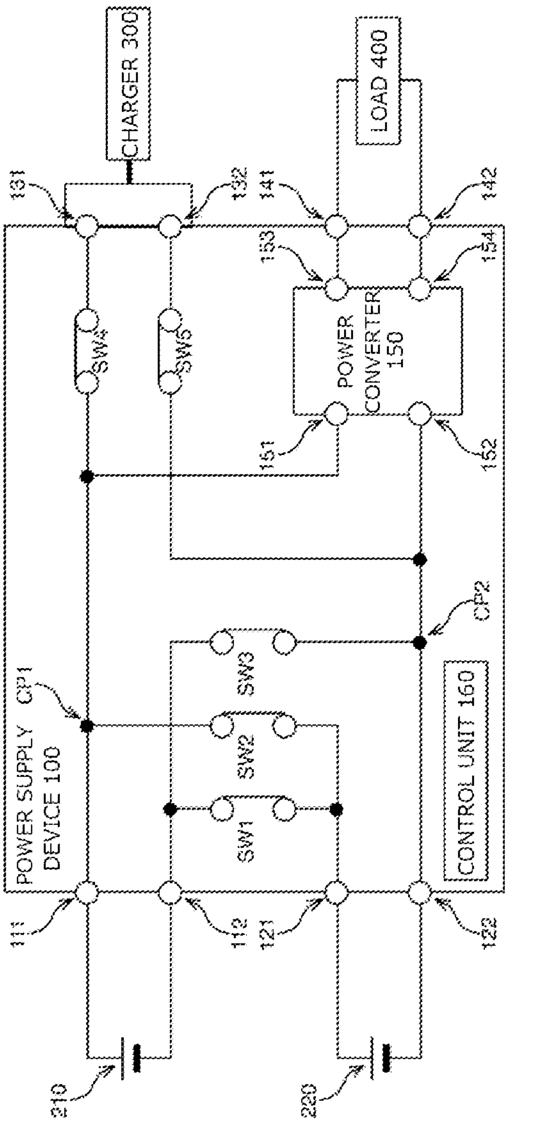
FIG. 1 is a diagram illustrating a power supply device 100 according to one embodiment of the present invention.

FIG. 1 is a diagram illustrating a power supply device 100 according to one embodiment of the present invention. The power supply device 100 includes a first positive electrode-side battery terminal 111, a first negative electrode-side battery terminal 112, a second positive electrode-side battery terminal 121, a second negative electrode-side battery terminal 122, a positive electrode-side input terminal 131, a negative electrode-side input terminal 132, a first switch SW1, a second switch SW2, a third switch SW3, a positive electrode-side output terminal 141, a negative electrode-side output terminal 142, and a power converter 150.

The first positive electrode-side battery terminal 111 and the first negative electrode-side battery terminal 112 are terminals for connecting a first battery 210. A positive electrode of the first battery 210 is connected to the first positive electrode-side terminal 111, and a negative electrode of the first battery 210 is connected to the first negative electrode-side battery terminal 112. The second positive electrode-side battery terminal 121 and the second negative electrode-side battery terminal 122 are terminals for connecting a second battery 220. A positive electrode of the second battery 220 is connected to the second positive electrode-side terminal 121, and a negative electrode of the second battery 220 is connected to the second negative electrode-side battery terminal 122. The first battery 210 and the second battery 220 are rechargeable batteries which can be charged with and discharge electric power, such as lithium-ion batteries. Drive voltages of the first battery 210 and the second battery 220 are the same and are a first voltage (for example, 400V or 500V).

The positive electrode-side input terminal 131 and the negative electrode-side input terminal 132 are terminals for connecting a charger 300. When a first charger 300A (for example, a fast charger) for supplying electric power with the first voltage is connected to the positive electrode-side input terminal 131 and the negative electrode-side input terminal 132, the electric power with the first voltage is input from the positive electrode-side input terminal 131 and the negative electrode-side input terminal 132. When a second charger 300B (for example, an ultra-fast charger) for supplying electric power with a second voltage (for example, 800V or 1000V) that is a voltage twice the first voltage is connected to the positive electrode-side input terminal 131 and the negative electrode-side input terminal 132, the electric power with the second voltage is input from the positive electrode-side input terminal 131 and the negative electrode-side input terminal 132.

The power converter 150 includes a positive electrode-side converter input terminal 151, a negative electrode-side converter input terminal 152, a positive electrode-side converter output terminal 153, and a negative electrode-side converter output terminal 154. The power converter 150 is configured to output, from the positive electrode-side converter output terminal 153 and the negative electrode-side converter output terminal 154, electric power that is inputted from the positive electrode-side converter input terminal 151 and the negative electrode-side converter input terminal 152. At that time, the power converter 150 operates in a mode (relay mode) in which electric power inputted from the positive electrode-side converter input terminal 151 and the negative electrode-side converter input terminal 152 is outputted from the positive electrode-side converter output terminal 153 and the negative electrode-side converter output terminal 154 without the voltage of the electric power inputted being converted, and in a mode (power conversion mode) in which electric power inputted from the positive electrode-side converter input terminal 151 and the negative electrode-side converter input terminal 152 is outputted from the positive electrode-side converter output terminal 153 and the negative electrode-side converter output terminal 154 with the voltage of the electric power inputted being converted. The power conversion mode includes at least one of a mode (step-up mode) in which electric power with the first voltage is converted to electric power with the second voltage or a mode (step-down mode) in which electric power with the second voltage is converted to electric power with the first voltage.

In this embodiment, the positive electrode-side input terminal 131 is connected to the first positive electrode-side battery terminal 111, and the negative electrode-side input terminal 132 is connected to the second negative electrode-side battery terminal 122.

The first switch SW1 is connected between the first negative electrode-side battery terminal 112 and the second positive electrode-side battery terminal 121. The second switch SW2 is connected between the second positive electrode-side battery terminal 121 and a first connection point CP1, the first connection point CP1 being between the positive electrode-side input terminal 131 and the first positive electrode-side battery terminal 111. A third switch SW3 is connected between the first negative electrode-side battery terminal 112 and a second connection point CP2, the second connection point CP2 being between the negative electrode-side input terminal 132 and the second negative electrode-side battery terminal 122.

Figure 2:
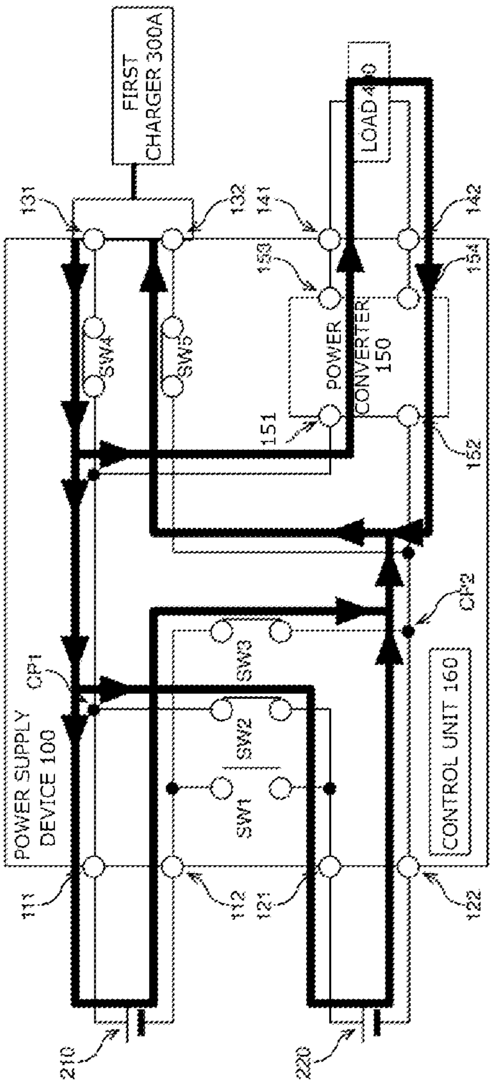
FIG. 2 is a diagram for explaining a flow of electric power in the power supply device 100.

Thus, in this embodiment, as shown in FIG. 2, in a state where the first switch SW1 is opened and the second switch SW2 and the third switch SW3 are closed, the first battery 210 and the second battery 220 are connected in parallel between the positive electrode-side input terminal 131 and the negative electrode-side input terminal 132. Consequently, as shown in FIG. 2, when the charger is connected to the positive electrode-side input terminal 131 and the negative electrode-side input terminal 132 in a state where the first switch SW1 is opened and the second switch SW2 and the third switch SW3 are closed, it is possible to charge with the first battery 210 and the second battery 220 connected in parallel.

Thus, in this embodiment, when the first charger 300A (for example, a fast charger) is connected to the positive electrode-side input terminal 131 and the negative electrode-side input terminal 132, the first switch SW1 is opened and the second switch SW2 and the third switch SW3 are closed so that the first battery 210 and the second battery 220 are charged with these batteries connected in parallel. In this way, in this embodiment, the first battery 210 and the second battery 220 can be charged with the electric power with the first voltage that is the drive voltage of the first battery 210 and the second battery 220.

Figure 3:
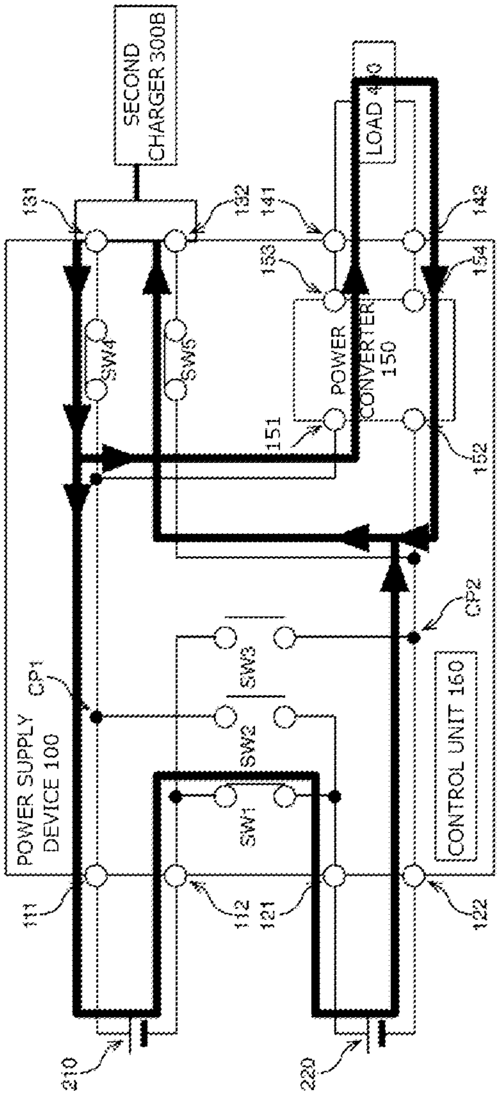
FIG. 3 is a diagram for explaining a flow of electric power in the power supply device 100.

Further, in this embodiment, as shown in FIG. 3, in a state where the first switch SW1 is closed and the second switch SW2 and the third switch SW3 are opened, the first battery 210 and the second battery 220 are connected in series between the positive electrode-side input terminal 131 and the negative electrode-side input terminal 132. Consequently, as shown in FIG. 3, when the charger 300 is connected to the positive electrode-side input terminal 131 and the negative electrode-side input terminal 132 in a state where the first switch SW1 is closed and the second switch SW2 and the third switch SW3 are opened, it is possible to charge with the first battery 210 and the second battery 220 connected in series.

Thus, in this embodiment, when the second charger 300B (for example, an ultra-fast charger) is connected to the positive electrode-side input terminal 131 and the negative electrode-side input terminal 132, the first switch SW1 is closed and the second switch SW2 and the third switch SW3 are opened so that the first battery 210 and the second battery 220 are charged with these batteries connected in series. In this way, in this embodiment, the first battery 210 and the second battery 220 can be charged with the electric power with the first voltage that is half the voltage of the second voltage, i.e., the electric power with the first voltage that is the drive voltage of the first battery 210 and the second battery 220.

The positive electrode-side output terminal 141 and the negative electrode-side output terminal 142 are terminals for connecting a load 400.

In this embodiment, the positive electrode-side output terminal 141 is connected to the positive electrode-side converter output terminal 153 of the power converter 150, and the negative electrode-side output terminal 142 is connected to the negative electrode-side converter output terminal 154 of the power converter 150.

The positive electrode-side converter input terminal 151 of the power converter 150 is connected to a line that connects the positive electrode-side input terminal 131 and the first positive electrode-side battery terminal 111, and the negative electrode-side converter input terminal 152 of the power converter 150 is connected to a line that connects the negative electrode-side input terminal 132 and the second negative electrode-side battery terminal 122.

Thus, in this embodiment, the voltage outputted from the charger 300 is inputted to the power converter 150.

In this embodiment, as shown in FIG. 2, when the first charger 300A is connected to the positive electrode-side input terminal 131 and the negative electrode-side input terminal 132, if a drive voltage of the load 400 connected to the positive electrode-side output terminal 141 and the negative electrode-side output terminal 142 is the first voltage, then the power converter 150 outputs electric power inputted without converting it. At this time, if a drive voltage of the load 400 connected to the positive electrode-side output terminal 141 and the negative electrode-side output terminal 142 is lower than the first voltage, then the power converter 150 steps down the first voltage to the drive voltage of the load 400 and outputs it, and if a drive voltage of the load 400 connected to the positive electrode-side output terminal 141 and the negative electrode-side output terminal 142 is higher than the first voltage, then the power converter 150 steps up the first voltage to the drive voltage of the load 400 and outputs it. Particularly, at this time, if a drive voltage of the load 400 connected to the positive electrode-side output terminal 141 and the negative electrode-side output terminal 142 is the second voltage, then the power converter 150 converts electric power with the first voltage to electric power with the second voltage and outputs it.

Further, in this embodiment, as shown in FIG. 3, when the second charger 300B is connected to the positive electrode-side input terminal 131 and the negative electrode-side input terminal 132, if a drive voltage of the load 400 connected to the positive electrode-side output terminal 141 and the negative electrode-side output terminal 142 is the second voltage, then the power converter 150 outputs electric power inputted without converting the voltage of the electric power inputted. At this time, if a drive voltage of the load 400 connected to the positive electrode-side output terminal 141 and the negative electrode-side output terminal 142 is lower than the second voltage, then the power converter 150 steps down the second voltage to the drive voltage of the load 400 and outputs it, and if a drive voltage of the load 400 connected to the positive electrode-side output terminal 141 and the negative electrode-side output terminal 142 is higher than the second voltage, then the power converter 150 steps up the second voltage to the drive voltage of the load 400 and outputs it. Particularly, at this time, if a drive voltage of the load 400 connected to the positive electrode-side output terminal 141 and the negative electrode-side output terminal 142 is the first voltage, then the power converter 150 converts electric power with the second voltage to electric power with the first voltage and outputs it.

Figure 4:
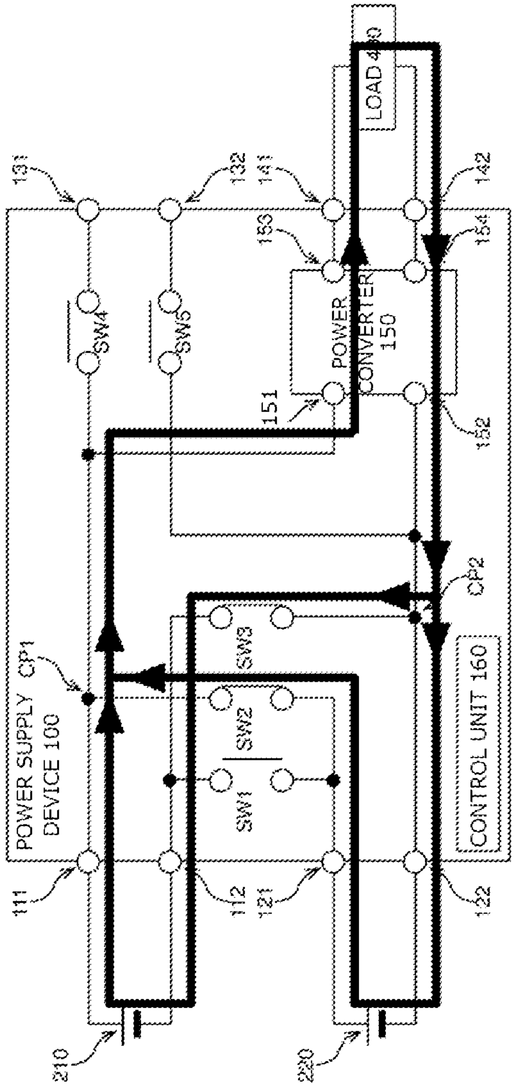
FIG. 4 is a diagram for explaining a flow of electric power in the power supply device 100.

Further, in this embodiment, when the charger 300 is not connected to the positive electrode-side input terminal 131 and the negative electrode-side input terminal 132 (for example, during traveling), if a drive voltage of the load 400 connected to the positive electrode-side output terminal 141 and the negative electrode-side output terminal 142 is the first voltage, then, for example, as shown in FIG. 4, the first switch SW1 is opened and the second switch SW2 and the third switch SW3 are closed so that the first battery 210 and the second battery 220 are connected in parallel, and the power converter 150 outputs electric power inputted without converting the voltage of the electric power inputted.

Figure 5:
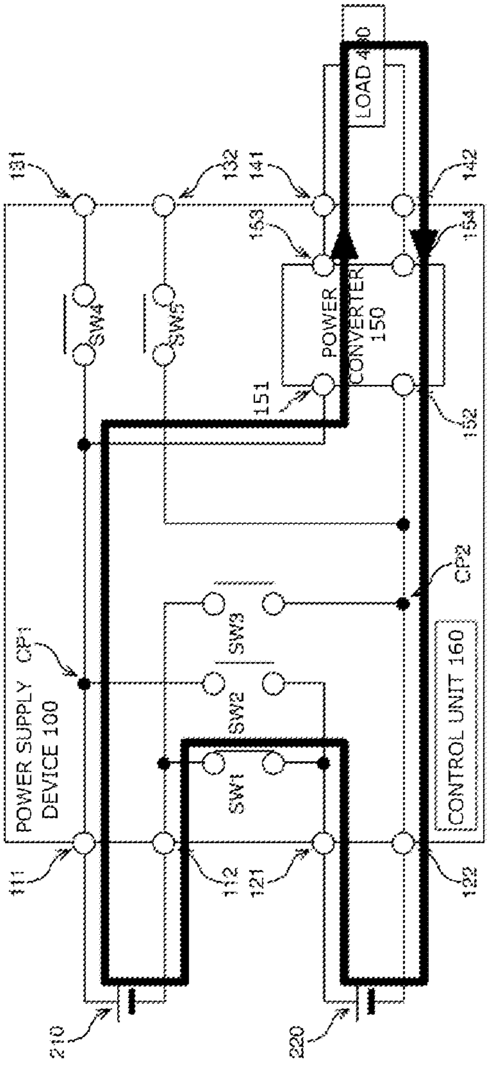
FIG. 5 is a diagram for explaining a flow of electric power in the power supply device 100.

Further, in this embodiment, when the charger 300 is not connected to the positive electrode-side input terminal 131 and the negative electrode-side input terminal 132 (for example, during traveling), if a drive voltage of the load 400 connected to the positive electrode-side output terminal 141 and the negative electrode-side output terminal 142 is the second voltage, then, for example, as shown in FIG. 5, the first switch SW1 is closed and the second switch SW2 and the third switch SW3 are opened so that the first battery 210 and the second battery 220 are connected in series, and the power converter 150 outputs electric power inputted without converting the voltage of the electric power inputted.

Further, when the charger 300 is not connected to the positive electrode-side input terminal 131 and the negative electrode-side input terminal 132 (for example, during traveling), if a drive voltage of the load 400 connected to the positive electrode-side output terminal 141 and the negative electrode-side output terminal 142 is lower than the first voltage, then the power converter 150 steps down the voltage of the electric power inputted to the drive voltage of the load 400 and outputs it. At this time, the first switch SW1 may be opened and the second switch SW2 and the third switch SW3 may be closed so that the first battery 210 and the second battery 220 are connected in parallel, as shown in FIG. 4, or the first switch SW1 may be closed and the second switch SW2 and the third switch SW3 may be opened so that the first battery 210 and the second battery 220 are connected in series, as shown in FIG. 5.

Further, when the charger 300 is not connected to the positive electrode-side input terminal 131 and the negative electrode-side input terminal 132 (for example, during traveling), if a drive voltage of the load 400 connected to the positive electrode-side output terminal 141 and the negative electrode-side output terminal 142 is higher than the first voltage but lower than the second voltage, then the first switch SW1 may be opened and the second switch SW2 and the third switch SW3 may be closed so that the first battery 210 and the second battery 220 are connected in parallel, as shown in FIG. 4, and the power converter 150 may step up the voltage of the electric power inputted to the drive voltage of the load 400 and output it, or the first switch SW1 may be closed and the second switch SW2 and the third switch SW3 may be opened so that the first battery 210 and the second battery 220 are connected in series, as shown in FIG. 5, and the power converter 150 may step down the voltage of the electric power inputted to the drive voltage of the load 400 and output it.

Further, when the charger 300 is not connected to the positive electrode-side input terminal 131 and the negative electrode-side input terminal 132 (for example, during traveling), if a drive voltage of the load 400 connected to the positive electrode-side output terminal 141 and the negative electrode-side output terminal 142 is higher than the second voltage, then the power converter 150 steps up the voltage of the electric power inputted to the drive voltage of the load 400 and outputs it. At this time, the first switch SW1 may be opened and the second switch SW2 and the third switch SW3 may be closed so that the first battery 210 and the second battery 220 are connected in parallel, as shown in FIG. 4, or the first switch SW1 may be closed and the second switch SW2 and the third switch SW3 may be opened so that the first battery 210 and the second battery 220 are connected in series, as shown in FIG. 5.

Thus, in this embodiment, in both cases where the positive electrode-side input terminal 131 and the negative electrode-side input terminal 132 are connected to the first charger 300A and the second charger 300B, it is possible to charge the first battery 210 and the second battery 220. Further, in this embodiment, it is possible to supply the load 400 with electric power with an appropriate voltage regardless of the drive voltage of the load 400 connected to the positive electrode-side output terminal 141 and the negative electrode-side output terminal 142. Consequently, in this embodiment, it is possible to provide the power supply device that can adapt to the plurality of chargers without requiring interruption of operation of the load.

Further, in this embodiment, when the charger 300 is not connected to the positive electrode-side input terminal 131 and the negative electrode-side input terminal 132 (for example, during traveling), the load 400 can be supplied with electric power from both of the first battery 210 and the second battery 220. Thus, the first battery 210 and the second battery 220 can be used evenly.

<Control of the First to Third Switches SW1-SW3 and the Power Converter 150>

The power supply device 100 may further include a control unit 160 configured to control the first switch SW1, the second switch SW2, the third switch SW3 and the power converter 150.

The control unit 160 may be configured to, when the charger 300 is not connected to the positive electrode-side input terminal 131 and the negative electrode-side input terminal 132 and when the load 400 with the drive voltage that is the first voltage is connected, control the first switch SW1, the second switch SW2 and the third switch SW3 such that the first switch SW1 is opened and the second switch SW2 and the third switch SW3 are closed, as shown in FIG. 4, and control the power converter 150 to operate in the relay mode. In this way, the first battery 210 and the second battery 220 are connected in parallel so that the electric power can be supplied to the load 400 from both of the first battery 210 and the second battery 220 without performing the power conversion in the power converter 150.

Further, the control unit 160 may be configured to, when the charger 300 is not connected to the positive electrode-side input terminal 131 and the negative electrode-side input terminal 132 and when the load 400 with the drive voltage that is the second voltage is connected, control the first switch SW1, the second switch SW2 and the third switch SW3 such that the first switch SW1 is closed and the second switch SW2 and the third switch SW3 are opened, as shown in FIG. 5, and control the power converter 150 to operate in the relay mode. In this way, the first battery 210 and the second battery 220 are connected in series so that the electric power can be supplied to the load 400 from both of the first battery 210 and the second battery 220 without performing the power conversion in the power converter 150.

Further, the control unit 160 may be configured to, when the charger 300 is not connected to the positive electrode-side input terminal 131 and the negative electrode-side input terminal 132 and when the load 400 with the drive voltage that is different from the first voltage and the second voltage is connected, control the power converter 150 so as to convert the electric power inputted to the electric power with the drive voltage of the load 400. In this way, even for the load 400 the drive voltage of which is different from the first voltage and the second voltage, the electric power from both the first battery 210 and the second battery 220 can be supplied to the load 400. At this time, the control unit 160 may control such that the first switch SW1 is opened and the second switch SW2 and the third switch SW3 are closed, as shown in FIG. 4, or such that the first switch SW1 is closed and the second switch SW2 and the third switch SW3 are opened, as shown in FIG. 5.

The control unit 160 may for example be configured to, when the first charger 300A is connected to the positive electrode-side input terminal 131 and the negative electrode-side input terminal 132 and when the load 400 with the drive voltage that is the first voltage is connected, control the first switch SW1, the second switch SW2 and the third switch SW3 such that the first switch SW1 is opened and the second switch SW2 and the third switch SW3 are closed, as shown in FIG. 2, and control the power converter 150 to operate in the relay mode. In this way, the first battery 210, the second battery 220 and the load 400 can be connected in parallel so the electric power with the first voltage can be supplied to the first battery 210, the second battery 220 and the load 400 from the first charger 300A.

The control unit 160 may for example be configured to, when the first charger 300A is not connected to the positive electrode-side input terminal 131 and the negative electrode-side input terminal 132 and when the load 400 with the drive voltage that is different from the first voltage is connected, control such that the first switch SW1 is opened and the second switch SW2 and the third switch SW3 are closed, as shown in FIG. 2, and control the power converter 150 such that the electric power inputted is converted to the electric power with the drive voltage of the load 400. In particular, it may be configured to, when the load 400 with the drive voltage that is the second voltage is connected, control such that the first switch SW1 is opened and the second switch SW2 and the third switch SW3 are closed, as shown in FIG. 2, and control the power converter 150 such that the electric power inputted is converted to the electric power with the second voltage. In this way, it is possible to supply the load 400 with the electric power with the drive voltage of the load 400, while supplying the first battery 210 and the second battery 220 with the electric power with the first voltage.

The control unit 160 may for example be configured to, when the second charger 300B is connected to the positive electrode-side input terminal 131 and the negative electrode-side input terminal 132 and when the load 400 with the drive voltage that is the second voltage is connected, control the first switch SW1, the second switch SW2 and the third switch SW3 such that the first switch SW1 is closed and the second switch SW2 and the third switch SW3 are opened, as shown in FIG. 3, and control the power converter 150 to operate in the relay mode. In this way, the first battery 210 and the second battery 220 can be connected in series, and the electric power with the first voltage can be supplied to the first battery 210 and the second battery 220 from the second charger 300B, while supplying the electric power with the second voltage to the load 400 from the second charger 300B.

The control unit 160 may for example be configured to, when the second charger 300B is connected to the positive electrode-side input terminal 131 and the negative electrode-side input terminal 132 and when the load 400 with the drive voltage that is different from the second voltage is connected, control such that the first switch SW1 is closed and the second switch SW2 and the third switch 142 are opened, as shown in FIG. 3, and control the power converter 150 to convert the electric power with the second voltage to the electric power with the drive voltage of the load 400. In particular, it may be configured to, when the load 400 with the drive voltage that is the first voltage is connected, control such that the first switch SW1 is closed and the second switch SW2 and the third switch SW3 are opened, as shown in FIG. 3, and control the power converter 150 to convert the electric power inputted to the electric power with the first voltage. In this way, it is possible to supply load 400 with the electric power with the drive voltage of the load 400, while supplying the first battery 210 and the second battery 220 with the electric power with the first voltage.

As shown in FIG. 1 and FIG. 2, a fourth switch SW4 may be provided at the positive electrode-side input terminal 131, and a fifth switch SW5 may be provided at the negative electrode-side input terminal 132. Further, the control unit 160 may be configured to control the fourth switch SW4 and the fifth switch SW5.

At this time, the control unit 160 may be configured to control the fourth switch SW4 and the fifth switch SW5 such that the fourth switch SW4 and the fifth switch SW5 are closed as shown in FIG. 2 and FIG. 3 when the charger 300 is connected to the positive electrode-side input terminal 131 and the negative electrode-side input terminal 132, and such that the fourth switch SW4 and the fifth switch SW5 are opened as shown in FIG. 4 and FIG. 5 when the charger 300 is not connected to the positive electrode-side input terminal 131 and the negative electrode-side input terminal 132. In this way, when the charger 300 is not connected to the positive electrode-side input terminal 131 and the negative electrode-side input terminal 132, the positive electrode-side input terminal 131 and the negative electrode-side input terminal 132 can be separated from the first battery 210 and the second battery 220.

<Configuration of the Power Converter 150>

Figure 6:
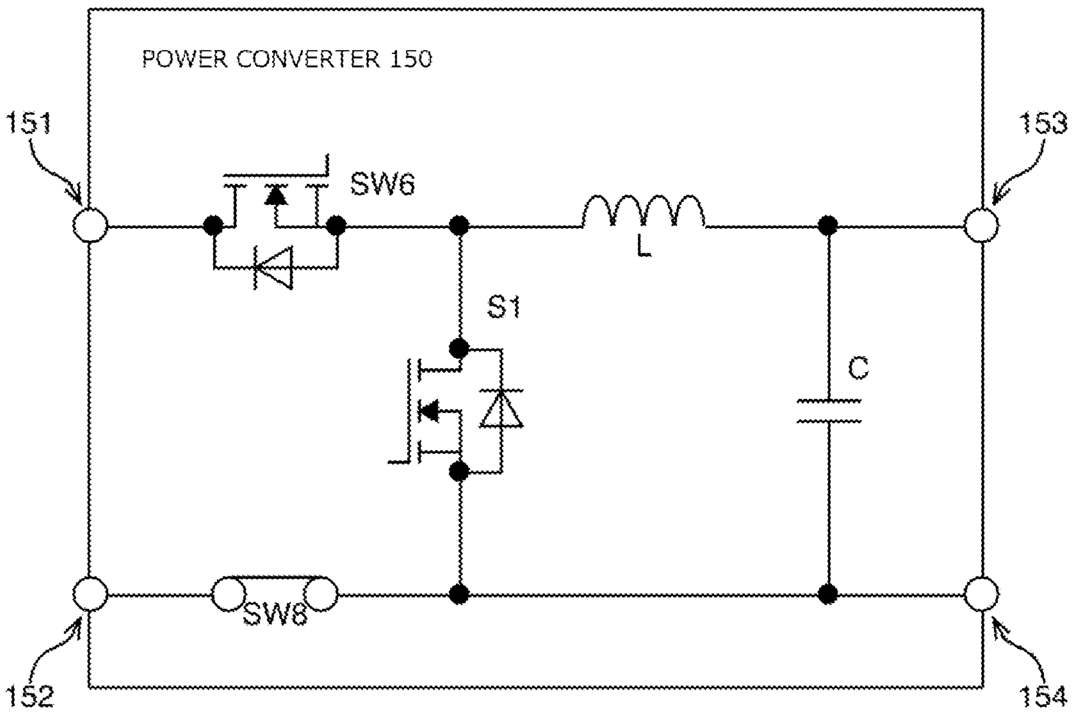
FIG. 6 is a diagram illustrating a configuration example of a power converter 150.

The power converter 150 may include, for example, a circuit configuration of a step-down chopper constituted of a switch, a diode, an inductor L and a capacitor C. In this case, the power converter 150 may include, for example, a sixth switch SW6 as a switch constituting the circuit configuration of the step-down chopper, as shown in FIG. 6. The sixth switch SW6 may be constituted of a switching element (e.g., MOSFET (Metal-Oxide-Semiconductor Field-Effect Transistor)), as shown in FIG. 6. In this way, when an abnormal current is generated in a high-voltage path, the switch SW6 operates as a semiconductor fuse so the abnormal current can be cut off. Further, when the abnormal current is cut off by the semiconductor as described above, no arc is generated, thus it is possible to provide safe and quick cut off. Further, as shown in FIG. 7, the sixth switch SW6 may be constituted of two switching elements S2, S3 connected in series.

Figure 7:
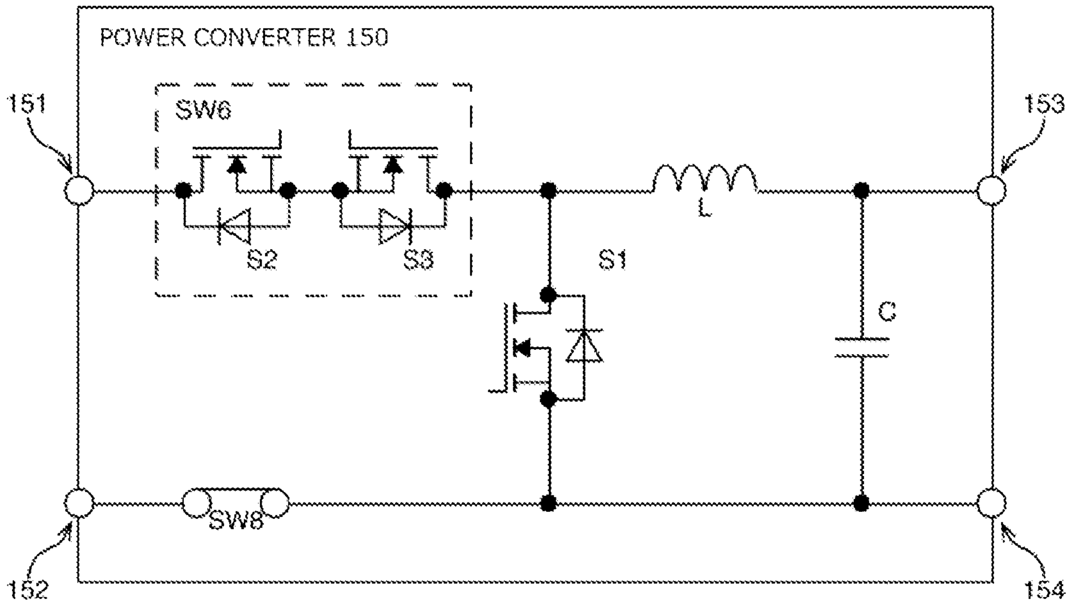
FIG. 7 is a diagram illustrating a configuration example of a power converter 150.

In addition, the power converter 150 may include, for example, a switching element S1 including a diode connected in parallel as a diode constituting the circuit configuration of the step-down chopper, as shown in FIG. 6 and FIG. 7. In this way, at a time when stopping the supply of the electric power to the load 400, the switching element S1 is turned on after the sixth switch SW6 is opened so the electric power stored in the capacitor C can be quickly discharged.

Figure 8:
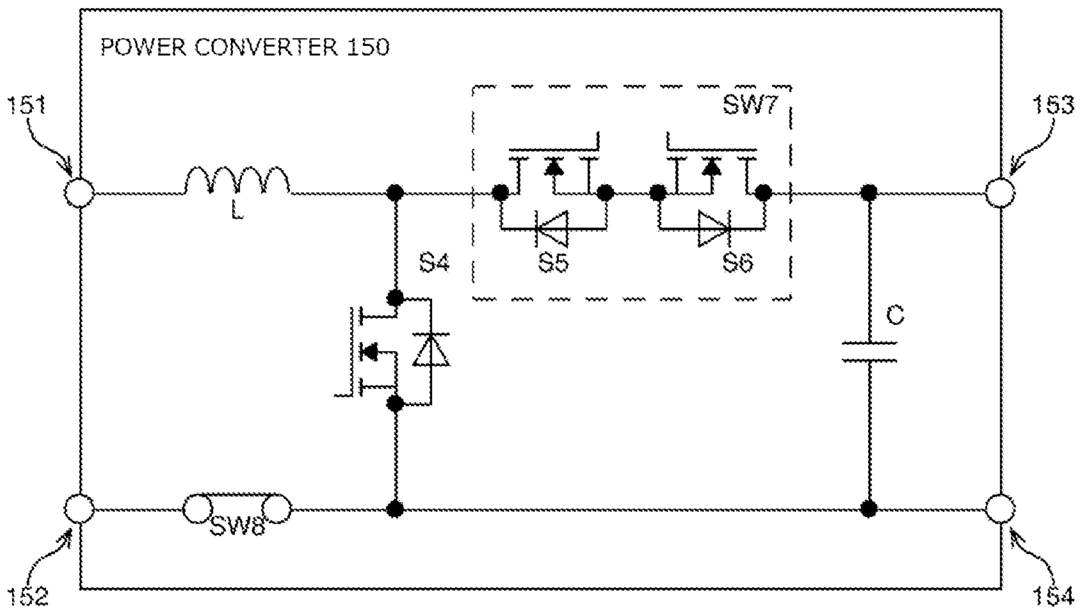
FIG. 8 is a diagram illustrating a configuration example of a power converter 150.

The power converter 150 may include, for example, a circuit configuration of a step-up chopper constituted of a switch, a diode, an inductor L and a capacitor C. In this case, the power converter 150 may include, for example, a seventh switch SW7 as a diode constituting the circuit configuration of the step-up chopper, as shown in FIG. 8. The seventh switch SW7 may for example be constituted of two switching elements S5, S6 including diodes connected in parallel. In this case, the diodes connected in parallel to the two switching elements S5, S6 are arranged such that a forward direction is opposite to each other.

Figure 9:
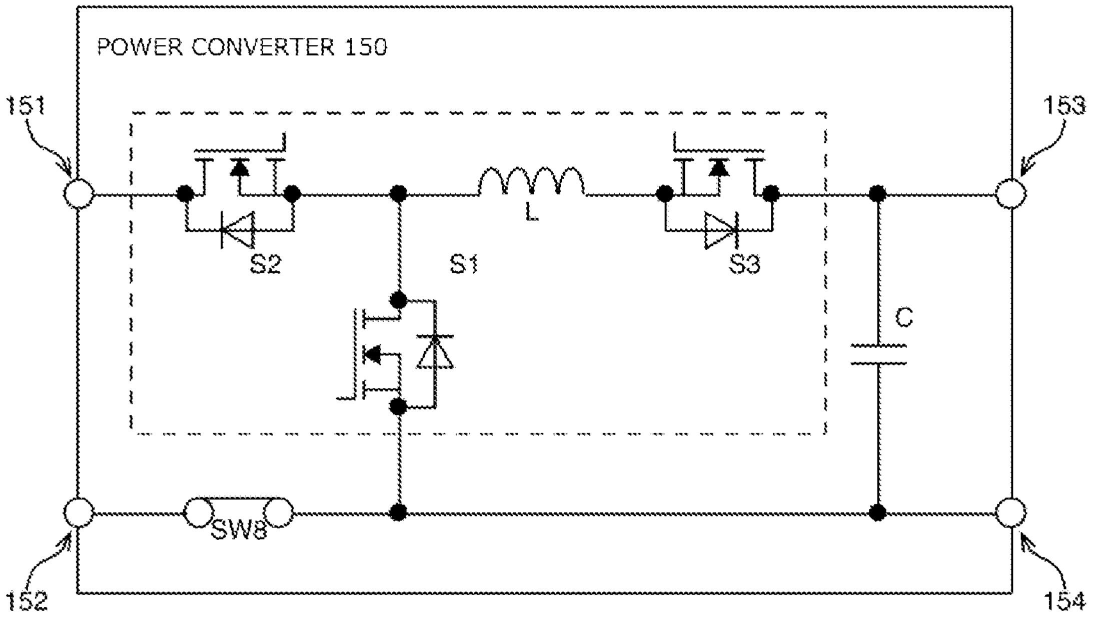
FIG. 9 is a diagram illustrating a configuration example of a power converter 150.
Figure 10:
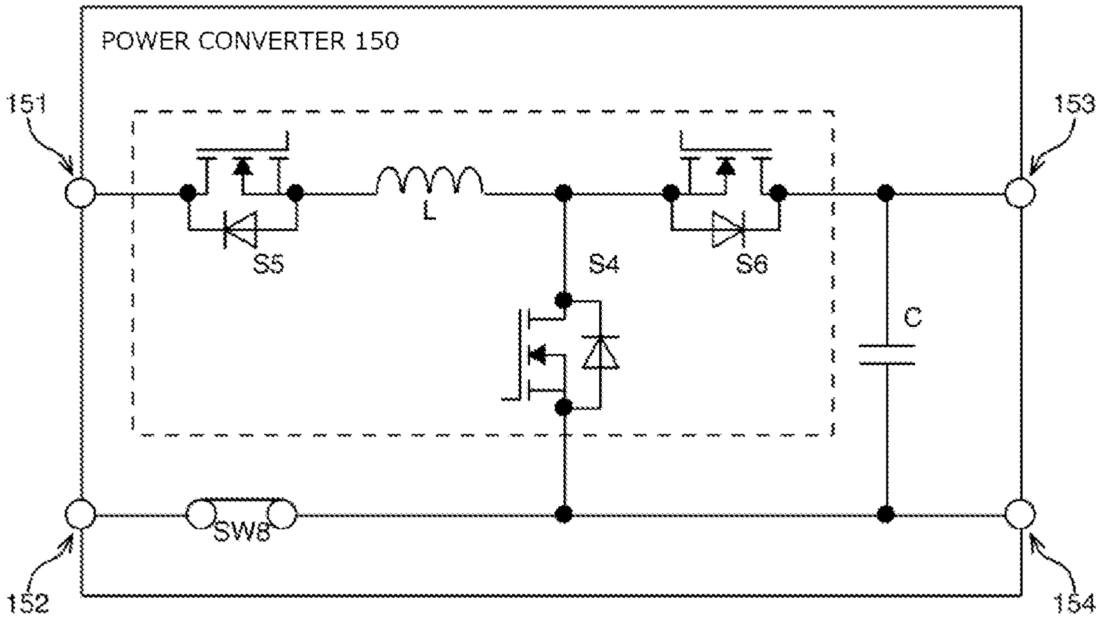
FIG. 10 is a diagram illustrating a configuration example of a power converter 150.

In the case where the sixth switch SW6 is constituted of the two switching elements S2, S3, an inductor L may be connected between the two switching elements S2, S3 as shown in FIG. 9, and in the case where the seventh switch SW7 is constituted of the two switching elements S5, S6, an inductor L may be connected between the two switching elements S5, S6 as shown in FIG. 10. In this way, a part constituted of the three switching elements S1-S3 and the inductor L in the circuit configuration of the step-down chopper of FIG. 9 and a part constituted of the three switching elements S4-S6 and the inductor L in the circuit configuration of the step-up chopper of FIG. 10 differs only in the connection orientation. Consequently, the circuit configuration of the step-up chopper of FIG. 10 can be obtained simply by changing the connection orientation of the part constituted of the three switching elements S1-S3 and the inductor L of the circuit configuration of the step-down chopper of FIG. 9 so the same component can be used for the step-down chopper and the step-up chopper.

As shown in FIG. 6 to FIG. 10, the power converter 150 may also include an eighth switch SW8 connected between the negative electrode-side converter input terminal 152 and the negative electrode-side converter output terminal 154. In this case, at a time when starting the supply of the electric power to the load 400, by closing the sixth switch SW6 or the seventh switch SW7 after closing the eighth switch SW8, the rise in the current in the inductor L is delayed so the load 400 can be pre-charged. Further, at a time when stopping the supply of the electric power to the load 400, by opening the eighth switch SW8 after the discharge of the electric power stored in the capacitor C, it is possible to quickly remove the residual voltage on the load 400 side.

The present invention has been described above with reference to the preferred embodiments of the present invention. Although the present invention has been described with reference to the specific examples, various modifications and changes can be made to these specific examples without departing from the spirit and scope of the present invention as set forth in the claims.

LIST OF REFERENCE SIGNS

100 power supply device
111 first positive electrode-side battery terminal
112 first negative electrode-side battery terminal
121 second positive electrode-side battery terminal
122 second negative electrode-side battery terminal
131 positive electrode-side input terminal
132 negative electrode-side input terminal
141 positive electrode-side output terminal
142 negative electrode-side output terminal
150 power converter
151 positive electrode-side converter input terminal
152 negative electrode-side converter input terminal
153 positive electrode-side converter output terminal
154 negative electrode-side converter output terminal
160 control unit
SW1 first switch
SW2 second switch SW3 third switch
210 first battery
220 second battery
300 charger
300A first charger
300B second charger
400 load

What is claimed is:

1. A power supply device comprising:
a first positive electrode-side battery terminal and a first negative electrode-side battery terminal for connecting a battery;
a second positive electrode-side battery terminal and a second negative electrode-side battery terminal for connecting a battery;
a positive electrode-side input terminal and a negative electrode-side input terminal for connecting a charger;
a positive electrode-side output terminal and a negative electrode-side output terminal for connecting a load;
a first switch;
a second switch;
a third switch, and
a power converter configured to operate in a power conversion mode, in which electric power inputted is converted in any of a step-up mode and a step-down mode, and a relay mode without converting a voltage of the electric power inputted, wherein
the positive electrode-side input terminal is connected to the first positive electrode-side battery terminal,
the negative electrode-side input terminal is connected to the second negative electrode-side battery terminal,
the first switch is connected between the first negative electrode-side battery terminal and the second positive electrode-side battery terminal,
the second switch is connected between a first connection point and the second positive electrode-side battery terminal, the first connection point being between the positive electrode-side input terminal and the first positive electrode-side battery terminal,
the third switch is connected between the first negative electrode-side battery terminal and a second connection point, the second connection point being between the negative electrode-side input terminal and the second negative electrode-side battery terminal,
the power converter includes a positive electrode-side converter input terminal, a negative electrode-side converter input terminal, a positive electrode-side converter output terminal, and a negative electrode-side converter output terminal,
the positive electrode-side output terminal is connected to the positive electrode-side converter output terminal,
the negative electrode-side output terminal is connected to the negative electrode-side converter output terminal,
the positive electrode-side converter input terminal is connected to a line that connects the positive electrode-side input terminal and the first positive electrode-side battery terminal, and
the negative electrode-side converter input terminal is connected to a line that connects the negative electrode-side input terminal and the second negative electrode-side battery terminal.

2. The power supply device according to claim 1, further comprising a control unit configured to control the first switch, the second switch, the third switch and the power converter, wherein
the control unit is configured to control the first switch, the second switch and the third switch such that the first switch is opened and the second switch and the third switch are closed and control the power converter to output electric power inputted without converting the electric power inputted, when
a first battery with a drive voltage that is a first voltage is connected to the first positive electrode-side battery terminal and the first negative electrode-side battery terminal,
a second battery with a drive voltage that is the first voltage is connected to the second positive electrode-side battery terminal and the second negative electrode-side battery terminal,
a first charger that supplies electric power with the first voltage is connected to the positive electrode-side input terminal and the negative electrode-side input terminal, and
a load with a drive voltage that is the first voltage is connected to the positive electrode-side output terminal and the negative electrode-side output terminal.

3. The power supply device according to claim 2, wherein
the control unit is configured to control the first switch, the second switch and the third switch such that the first switch is closed and the second switch and the third switch are opened and control the power converter to convert electric power inputted to electric power with the first voltage and output it, when
the first battery is connected to the first positive electrode-side battery terminal and the first negative electrode-side battery terminal,
the second battery is connected to the second positive electrode-side battery terminal and the second negative electrode-side battery terminal,
a second charger that supplies electric power with a second voltage that is a voltage twice the first voltage is connected to the positive electrode-side input terminal and the negative electrode-side input terminal, and
the load is connected to the positive electrode-side output terminal and the negative electrode-side output terminal.

4. The power supply device according to claim 3, wherein
the control unit is configured to control the first switch, the second switch and the third switch such that the first switch is opened and the second switch and the third switch are closed and control the power converter to output electric power inputted without converting the electric power inputted, when
the first battery is connected to the first positive electrode-side battery terminal and the first negative electrode-side battery terminal,
the second battery is connected to the second positive electrode-side battery terminal and the second negative electrode-side battery terminal,
a charger is not connected to the positive electrode-side input terminal and the negative electrode-side input terminal, and
the load is connected to the positive electrode-side output terminal and the negative electrode-side output terminal.

5. The power supply device according to claim 4, wherein the power converter includes a circuit configuration of a step-down chopper and includes a switching element including a diode connected in parallel as a diode constituting the circuit configuration of the step-down chopper.

6. The power supply device according to claim 1, further comprising a control unit configured to control the first switch, the second switch, the third switch and the power converter, wherein the control unit is configured to control the first switch, the second switch and the third switch such that the first switch is closed and the second switch and the third switch are opened and control the power converter to output electric power inputted without converting the electric power inputted, when a first battery with a drive voltage that is a first voltage is connected to the first positive electrode-side battery terminal and the first negative electrode-side battery terminal, a second battery with a drive voltage that is the first voltage is connected to the second positive electrode-side battery terminal and the second negative electrode-side battery terminal, a second charger that supplies electric power with a second voltage that is a voltage twice the first voltage is connected to the positive electrode-side input terminal and the negative electrode-side input terminal, and a load with a drive voltage that is the second voltage is connected to the positive electrode-side output terminal and the negative electrode-side output terminal.

7. The power supply device according to claim 6, wherein the control unit is configured to control the first switch, the second switch and the third switch such that the first switch is opened and the second switch and the third switch are closed and control the power converter to convert electric power inputted to electric power with the second voltage and output it, when the first battery is connected to the first positive electrode-side battery terminal and the first negative electrode-side battery terminal, the second battery is connected to the second positive electrode-side battery terminal and the second negative electrode-side battery terminal, a first charger that supplies electric power with the first voltage is connected to the positive electrode-side input terminal and the negative electrode-side input terminal, and the load is connected to the positive electrode-side output terminal and the negative electrode-side output terminal.

8. The power supply device according to claim 7, wherein the control unit is configured to control the first switch, the second switch and the third switch such that the first switch is closed and the second switch and the third switch are opened and control the power converter to output electric power inputted without converting the electric power inputted, when the first battery is connected to the first positive electrode-side battery terminal and the first negative electrode-side battery terminal, the second battery is connected to the second positive electrode-side battery terminal and the second negative electrode-side battery terminal, a charger is not connected to the positive electrode-side input terminal and the negative electrode-side input terminal, and the load is connected to the positive electrode-side output terminal and the negative electrode-side output terminal.

9. The power supply device of claim 8, wherein the power converter includes a circuit configuration of a step-up chopper and includes two switching elements including diodes connected in parallel as diodes constituting the circuit configuration of the step-up chopper.

10. The power supply device according to claim 9, wherein an inductor constituting the circuit configuration of the step-up chopper is connected between the two switching elements.

11. A power supply device comprising:

a first positive electrode-side battery terminal and a first negative electrode-side battery terminal for connecting a battery;

a second positive electrode-side battery terminal and a second negative electrode-side battery terminal for connecting a battery;

a positive electrode-side input terminal and a negative electrode-side input terminal for connecting a charger;

a positive electrode-side output terminal and a negative electrode-side output terminal for connecting a load;

a first switch;

a second switch;

a third switch;

a power converter; and a control unit configured to control the first switch, the second switch, the third switch and the power converter, wherein the positive electrode-side input terminal is connected to the first positive electrode-side battery terminal, the negative electrode-side input terminal is connected to the second negative electrode-side battery terminal, the first switch is connected between the first negative electrode-side battery terminal and the second positive electrode-side battery terminal, the second switch is connected between a first connection point and the second positive electrode-side battery terminal, the first connection point being between the positive electrode-side input terminal and the first positive electrode-side battery terminal, the third switch is connected between the first negative electrode-side battery terminal and a second connection point, the second connection point being between the negative electrode-side input terminal and the second negative electrode-side battery terminal, the power converter includes a positive electrode-side converter input terminal, a negative electrode-side converter input terminal, a positive electrode-side converter output terminal, and a negative electrode-side converter output terminal, the positive electrode-side output terminal is connected to the positive electrode-side converter output terminal, the negative electrode-side output terminal is connected to the negative electrode-side converter output terminal, the positive electrode-side converter input terminal is connected to a line that connects the positive electrode-side input terminal and the first positive electrode-side battery terminal, the negative electrode-side converter input terminal is connected to a line that connects the negative electrode-side input terminal and the second negative electrode-side battery terminal, and the control unit is configured to control the first switch, the second switch and the third switch such that the first switch is opened and the second switch and the third switch are closed and control the power converter to output electric power inputted without converting the electric power inputted, when a first battery with a drive voltage that is a first voltage is connected to the first positive electrode-side battery terminal and the first negative electrode-side battery terminal, a second battery with a drive voltage that is the first voltage is connected to the second positive electrode-side battery terminal and the second negative electrode-side battery terminal, a first charger that supplies electric power with the first voltage is connected to the positive electrode-side input terminal and the negative electrode-side input terminal, and a load with a drive voltage that is the first voltage is connected to the positive electrode-side output terminal and the negative electrode-side output terminal.

12. A power supply device comprising:

a first positive electrode-side battery terminal and a first negative electrode-side battery terminal for connecting a battery;

a second positive electrode-side battery terminal and a second negative electrode-side battery terminal for connecting a battery;

a positive electrode-side input terminal and a negative electrode-side input terminal for connecting a charger;

a positive electrode-side output terminal and a negative electrode-side output terminal for connecting a load;

a first switch;

a second switch;

a third switch;

a power converter; and a control unit configured to control the first switch, the second switch, the third switch and the power converter, wherein the positive electrode-side input terminal is connected to the first positive electrode-side battery terminal, the negative electrode-side input terminal is connected to the second negative electrode-side battery terminal, the first switch is connected between the first negative electrode-side battery terminal and the second positive electrode-side battery terminal, the second switch is connected between a first connection point and the second positive electrode-side battery terminal, the first connection point being between the positive electrode-side input terminal and the first positive electrode-side battery terminal, the third switch is connected between the first negative electrode-side battery terminal and a second connection point, the second connection point being between the negative electrode-side input terminal and the second negative electrode-side battery terminal, the power converter includes a positive electrode-side converter input terminal, a negative electrode-side converter input terminal, a positive electrode-side converter output terminal, and a negative electrode-side converter output terminal, the positive electrode-side output terminal is connected to the positive electrode-side converter output terminal, the negative electrode-side output terminal is connected to the negative electrode-side converter output terminal, the positive electrode-side converter input terminal is connected to a line that connects the positive electrode-side input terminal and the first positive electrode-side battery terminal, the negative electrode-side converter input terminal is connected to a line that connects the negative electrode-side input terminal and the second negative electrode-side battery terminal, the control unit is configured to control the first switch, the second switch and the third switch such that the first switch is closed and the second switch and the third switch are opened and control the power converter to output electric power inputted without converting the electric power inputted, when a first battery with a drive voltage that is a first voltage is connected to the first positive electrode-side battery terminal and the first negative electrode-side battery terminal, a second battery with a drive voltage that is the first voltage is connected to the second positive electrode-side battery terminal and the second negative electrode-side battery terminal, a second charger that supplies electric power with a second voltage that is a voltage twice the first voltage is connected to the positive electrode-side input terminal and the negative electrode-side input terminal, and a load with a drive voltage that is the second voltage is connected to the positive electrode-side output terminal and the negative electrode-side output terminal.

* * * * *